United States Patent [19]

Borland

[11] 3,919,492

[45] Nov. 11, 1975

[54] SOLID STATE INTERRUPTER

[75] Inventor: Walter G. Borland, Waterford, Pa.

[73] Assignee: Basic Incorporated, Cleveland, Ohio

[22] Filed: Aug. 29, 1973

[21] Appl. No.: 392,431

[52] U.S. Cl. ................................ 179/84 R; 179/99

[51] Int. Cl.$^2$ ........................................ H04M 1/26

[58] Field of Search ... 179/84 R, 84 L, 84 T, 84 SS, 179/84 A, 99, 18 FA

[56] References Cited

UNITED STATES PATENTS

| | | | |
|---|---|---|---|
| 3,059,061 | 10/1962 | Merkel | 179/84 R |
| 3,155,777 | 11/1964 | Owen | 179/84 SS |
| 3,536,852 | 10/1970 | Dolarmore | 179/84 R |
| 3,581,020 | 5/1971 | Ribner et al. | 179/84 R |
| 3,637,948 | 1/1972 | Ribner et al. | 179/84 R |
| 3,683,118 | 8/1972 | Vago et al. | 179/84 R |

FOREIGN PATENTS OR APPLICATIONS

| | | | |
|---|---|---|---|
| 790,125 | 7/1968 | Canada | 179/84 R |

*Primary Examiner*—Kathleen H. Claffy
*Assistant Examiner*—Gerald L. Brigance
*Attorney, Agent, or Firm*—Donnelly, Maky, Renner & Otto

[57] ABSTRACT

An interrupter for use in telephone signalling systems or the like is comprised entirely of solid state circuitry to perform switching functions to provide from a plurality of AC and DC input signals respective interrupted activating output signals at selected frequencies and for selected duty cycles during cyclical occurrence of each output signal. The solid state interrupter uses a unique binary counting sequence which minimizes the decoding logic required to attain the numerous interruption patterns in the interrupted activating output signals. The logic circuit includes a clock oscillator, J-K flip-flop binary counter, feedback logic, and decode output logic circuit portions including NAND and NOR gate configurations and the gating circuit includes transistorized circuits for selected switching of DC signals and for controlling solid state relays for selected switching of AC signals.

18 Claims, 6 Drawing Figures

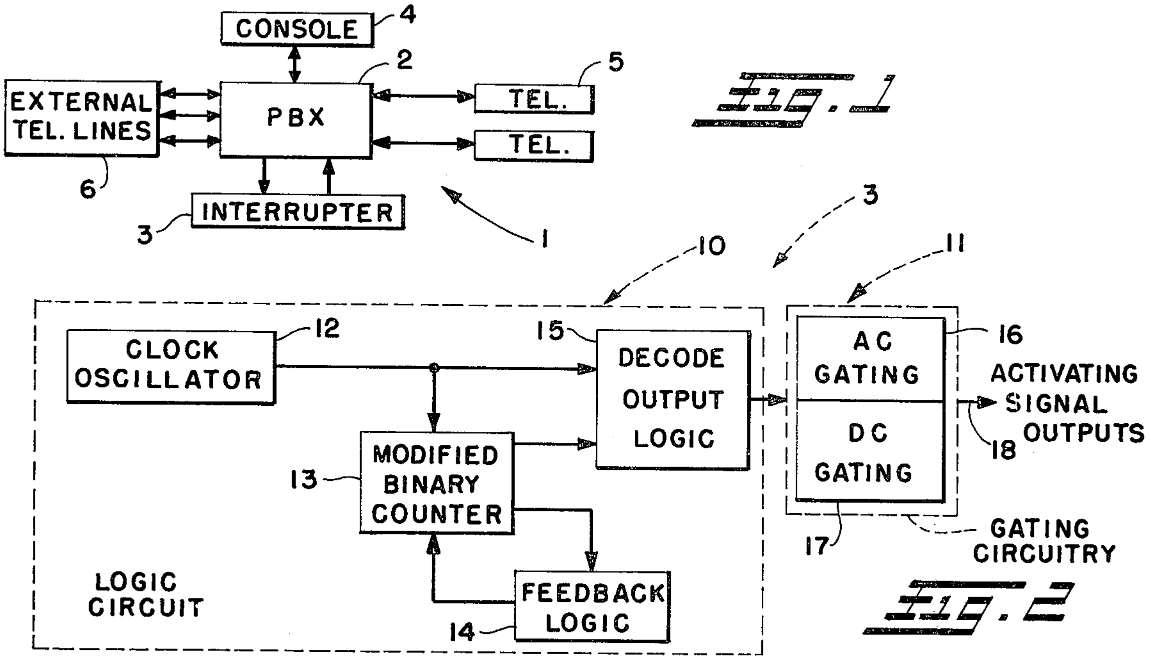
FIG. 1 FIG. 2
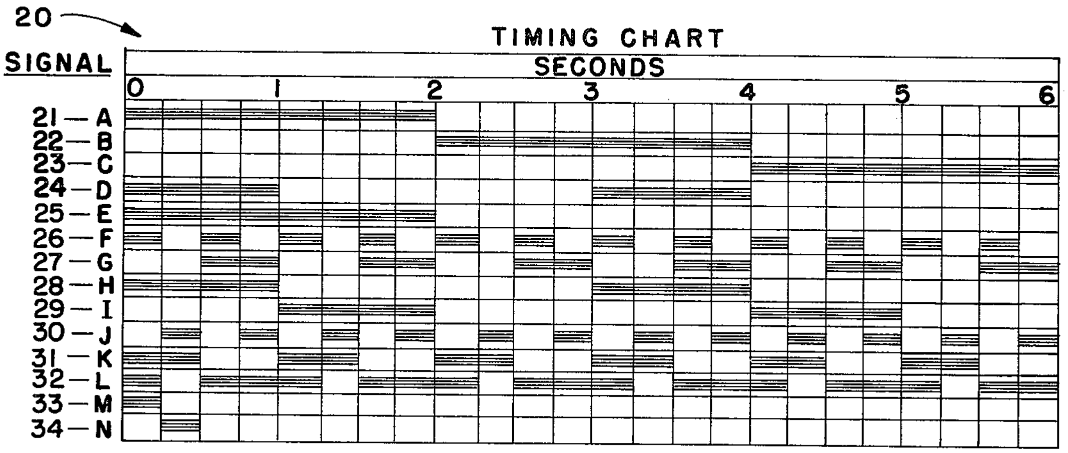
FIG. 3
59
TRUTH TABLE
| | COUNTER | | | | OUTPUTS | | | | | | | | | | | | | |
|---|---|---|---|---|---|---|---|---|---|---|---|---|---|---|---|---|---|---|
| | 55-Q | 54-Q | 53-Q | 52-Q | A/E | B | C | D | F | G | H | I | J | K | L | M | N |
| 60 | 0 | 0 | 0 | 0 | 1 | 0 | 0 | 1 | 1/0 | 0 | 1 | 0 | 0/1 | 1 | 1/0 | 0/1 | 1/0 |
| 61 | 0 | 0 | 0 | 1 | 1 | 0 | 0 | 1 | 1/0 | 1 | 1 | 0 | 0/1 | 0 | 1 | 1 | 1 |
| 62 | 1 | 0 | 1 | 0 | 1 | 0 | 0 | 0 | 1/0 | 0 | 0 | 1 | 0/1 | 1 | 1/0 | 1 | 1 |
| 63 | 1 | 0 | 1 | 1 | 1 | 0 | 0 | 0 | 1/0 | 1 | 0 | 1 | 0/1 | 0 | 1 | 1 | 1 |
| 64 | 0 | 1 | 0 | 0 | 0 | 1 | 0 | 0 | 1/0 | 0 | 0 | 0 | 0/1 | 1 | 1/0 | 1 | 1 |
| 65 | 0 | 1 | 0 | 1 | 0 | 1 | 0 | 0 | 1/0 | 1 | 0 | 0 | 0/1 | 0 | 1 | 1 | 1 |
| 66 | 0 | 1 | 1 | 0 | 0 | 1 | 0 | 1 | 1/0 | 0 | 1 | 0 | 0/1 | 1 | 1/0 | 1 | 1 |
| 67 | 0 | 1 | 1 | 1 | 0 | 1 | 0 | 1 | 1/0 | 1 | 1 | 0 | 0/1 | 0 | 1 | 1 | 1 |
| 68 | 1 | 0 | 0 | 0 | 0 | 0 | 1 | 0 | 1/0 | 0 | 0 | 1 | 0/1 | 1 | 1/0 | 1 | 1 |
| 69 | 1 | 0 | 0 | 1 | 0 | 0 | 1 | 0 | 1/0 | 1 | 0 | 1 | 0/1 | 0 | 1 | 1 | 1 |
| 70 | 0 | 0 | 1 | 0 | 0 | 0 | 1 | 0 | 1/0 | 0 | 0 | 0 | 0/1 | 1 | 1/0 | 1 | 1 |
| 71 | 0 | 0 | 1 | 1 | 0 | 0 | 1 | 0 | 1/0 | 1 | 0 | 0 | 0/1 | 0 | 1 | 1 | 1 |
FIG. 5

SOLID STATE INTERRUPTER

BACKGROUND OF THE INVENTION

This invention relates to solid state interrupters and more particularly to a free running solid state interrupter having no moving parts and capable of interrupting both DC and AC signals for controlling a plurality of signalling functions in a telephone system or the like.

Interrupters have been used in telephone systems for the purpose of providing fixed periodic interruption of both AC and DC signals appearing on telephone lines for achieving a certain output normally at the telephone unit itself. For example, interrupters may be used to interrupt the passage of ringing signals generated by external equipment and directed to energize the bell in a telephone unit in accordance with closure of appropriate contacts at a PBX station (private branch exchange), whereby when a particular telephone number is dialed at one telephone unit, the PBX switch gear closes a contact to effect a ringing of th dialed telephone unit by one of the activating output signals, i.e. the periodically interrupted ringing signal, from the interrupter. Also, interrupters may be used to provide periodically interrupted activating output signals for producing busy tones, message waiting signals for flashing a remote signal lamp, wink lamp control for indicating at an operator's console that a particular line is busy or seized, etc.

In the past interruption of telephone signals was provided by mechanical interrupters, which included a synchronous motor and cam arrangement for sequentially and periodically activating plural switches or relays, and by solid state systems, which utilize a plurality of mechanical relays for effecting interruption. A major disadvantage with the former prior art system of interruption is the large amount of power required to drive the motor, while a disadvantage with both prior art systems is the potential breakdown hazard of the relays used due either to arcing at the contacts thereof or due to the wearing of moving parts.

SUMMARY OF THE INVENTION

The solid state interrupter of the invention provides for interruption of both AC and DC signals for different selected time intervals in order to control signalling functions in a telephone system, such interruption being achieved completely using solid state devices without moving parts such as relays, motors, cams or the like. The solid state interrupter is versatile in that it is capable of connection in various types of telephone systems and includes a logic circuit having a clock oscillator, modified binary counter and feedback portion therefore coupled to effect production of logic signals that control a gating circuit which delivers activating output signals on a plurality of respective channels for use in the telephone system. Moreover, by using a unique binary counting sequence the interrupter is capable of providing activating output signals having frequencies other than those which are the clock signal frequency divided by multiples of two, thus minimizing the decoding logic required to achieve desired interruption patterns and simplifying the gating portion of the interrupter relative to more complicated prior art devices.

By utilizing solid state circuitry, the interrupter is more compact and more reliable than conventional interrupters. Moreover, the solid state interupter is free-running and has the capability of providing a plurality of separate activating output signals including in the preferred embodiment three separate out of phase telephone ringing signals, a priority ringing signal, a busy tone, a reorder tone for indicating a busy trunk line, two message waiting signals, a wink lamp signal for indicating to an operator that a line is busy or seized, two additional signals for driving lamps or relays on an operator's console or elsewhere to indicate holding or seizing of a line or any other telephone function, and two timing pulses for proper synchronization with PBX equipment.

The interrupter provides multiple signalling function capability in a telephone system by periodically and cyclically interrupting and passing AC and DC signals. For example, the three separate AC ringing tones cause a ringing at telephone units to indicate an incoming call, and the ringing tones are out of phase with each other so that when two calls are received concurrently at respective proximate telephone units, the ringing thereof will occur out of phase to avoid confusion as to which is actually ringing. Moreover, the priority ringing capability permits an indication at the called telephone unit that a priority or long distance call is on the line. Each of the ring tone circuits also has a ring trip relay grounding circuit coupled therein. The AC ring back tone, AC trunk reorder tone, and AC busy tone all indicate that the calling party that the called telephone unit is ringing, the trunk line is busy, or the called telephone unit is busy, respectively.

Each of the DC signals periodically and cyclically interrupted and passed by the interrupter may be used to provide various signalling functions. For example, the message waiting signal may be a 50 volt pulsed signal connected to indicate at the telephone unit that a call had been received earlier and a message is waiting at the console. Also, the fast ground pulse, slow ground pulse and wink ground pulse signals may be used to indicate at the telephone units or at the console that a particular telephone line is being held, receiving an incoming call, or in busy or seized condition, respectively. The sync grounding pulses may be used, respectively, to synchronize the interrupter with the PBX and signals from other external equipment. The modified counting sequence and logic circuit permits, for example, the development from a clock signal having a 120 impulse per minute frequency of activating output signals having frequencies of 120, 60, 30, 20, and 10 impulses per minute, each activating output signal having various selected duty cycles.

Accordingly, a primary object of the invention is to provide an interrupter improved in the noted rspect.

Another object of the invention is to provide a free-running solid state interrupter for producing plural activating output signals for use in a telephone system or the like.

An additional object of the invention is to provide a solid state interrupter for effecting signalling in a telephone system or the like.

A further object of the invention is to interrupt both AC and DC signals for predetermined different time intervals in order to control signalling in a telephone system or the like by using a solid state device.

Yet another object of the invention is to provide a ring trip relay grounding circuit.

These and other objects and advantages are realized in the instant invention which comprises a free-running solid state interrupter for providing plural activating output signals on a plurality of output channels to control signalling functions in a telephone system or the like.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a block diagram of an interrupter in a telephone system;

FIG. 2 is a block diagram of a solid state interrupter showing the logic and gating circuits in accordance with the invention;

FIG. 3 is a chart representative of the frequency, phase relation, and duration of activating output signals developed by the interrupter;

FIG. 5 ia a table representative of the cyclical operation of the logic circuit of FIG. 4; and the FIG. 6 is a schematic electric circuit diagram of the gating circuit of the solid state interrupter.

DESCRIPTION OF THE PREFERRED EMBODIMENT

Figure 4:
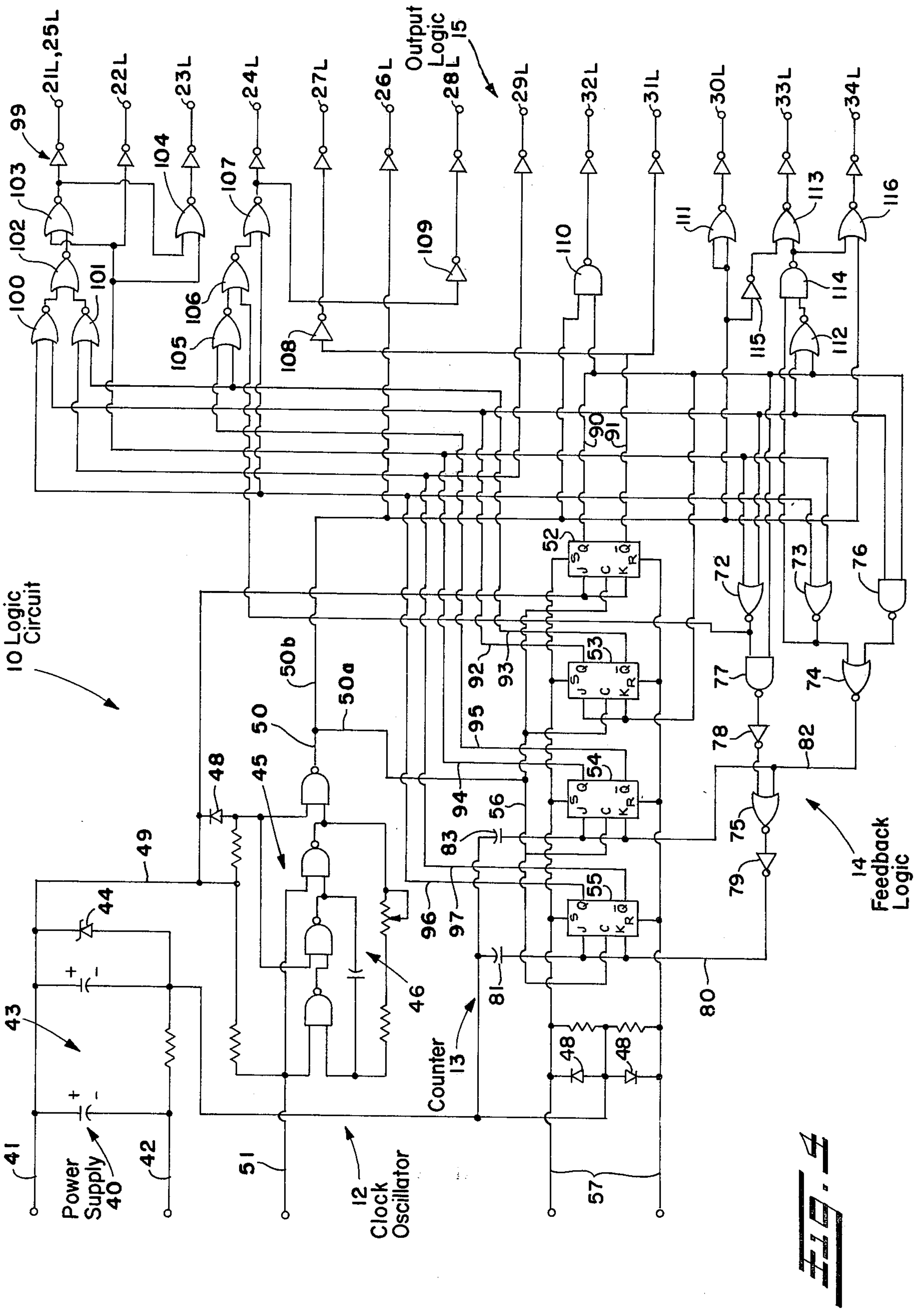
FIG. 4 is a schematic electric circuit diagram of the logic circuit of the solid state interrupter.

Referring now more particularly to the drawings, a telephone system generally indicated at 1 in FIG. 1 includes a PBX 2 (private branch exchange) to which interrupter 3, console 4, the telephone units 5 are connected. One or more external telephone lines are indicated at 6 for connection to the console 4 and telephone units 5 through the PBX 2.

In normal operation of the telephone system 1 an incoming call on one of the external telephone lines 6 is received at the console 4 and answered by the operator who then effects a connection of such line through the PBX 2 to the appropriate telephone unit 5. When the operator initiates such connection, the PBX closes a relay to permit one of the interrupted ringing tone signals from the proper interrupter channel to effect ringing of such telephone unit. When the telephone unit is answered, the previously mentioned PBX relay is opened to eliminate the interrupted ringing tone signal from the telephone unit and a further PBX relay is closed, for example, to couple another interrupter channel to the telephone system to produce a wink lamp signal at the console 4 and, if desired, at all telephone units to indicate that the particular telephone line is in use.

The interrupter in accordance with the present invention provides multiple signalling capability in the telephone system 1 and may be used, for example, to indicate by use of a message light that a telephone call had been received earlier and a message is waiting at the console desk. Moreover, the interrupter 3 also provides for a priority ringing signal to effect an unusual and distinctive ringing of the appropriate telephone unit and under the control of the console 4 and PBX 2 to indicate, for example, that a priority or long distance call is being held for that telephone unit. Also, the interrupter 3 provides a busy tone in the event that one telephone unit is dialing another telephone unit and the latter is busy, provides a reorder or trunk busy tone when an attempt is made to dial from an internal telephone unit to obtain an external telephone line and the latter is busy, and provides other signalling capability as will become more apparent below.

Turning now to FIG. 2, the interrupter 3 is illustrated in block diagram form as comprising a logic circuit 10 and a gating circuit 11, the former including clock oscillator 12, modified binary counter 13, feedback logic 14, and decode output logic 15 portions interconnected as illustrated by the several arrows. The gating circuit 11 is divided into an AC gating portion 16 and a DC gating portion 17 and provides a plurality of activating output signals at the activating signal outputs 18 for controlling the various signalling functions in the telephone system 1. Preferably the logic and gating circuits utilize complimentary metal oxide substrate devices, which are relatively inexpensive, and have a high noise immunity, high fan out, and require only a low bias current, although other logic forms may be used. The clock oscillator 12, which may be a conventional device, such as the model MC14011 manufactured by Motorola, Phoenix, Arizona, produces a generally square wave output pulse, for example, at a frequency of 2 Hz (120 impulses per minute). The modified binary counter 13 includes, for example, a number of conventional JK flip-flop circuits, which develop counting signals for application to the decode output logic 15 and the feedback logic 14, which provides for some modification of the otherwise normal counting functions of the modified binary counter 13 to enable the interrupter 3 to produce activating output signals having duty cycle frequencies that need not be simply a ratio of the clock oscillator frequency divided by multiples of two. The duty cycle frequencies will be referred to hereinafter as frequencies, although during each duty cycle of the AC signals passed by the interrupter 3 and AC signals actually passed have real frequencies of from about 20 Hz to about 480 Hz.

The decode output logic portion 15 of the logic circuit 10 provides logic output signals for application to the gating circuit 11 either at the AC or DC gating portions 16, 17 thereof. Both the AC and DC gating portions are controlled by the logic circuit 10 to produce, for example, the activating output signals having frequencies and phase relations as depicted in the Timing Chart 20 shown in FIG. 3.

Referring now specifically to FIG. 3, the Timing Chart 20 is shown indicating the frequency, duration, and phase relation of the plurality of activating output signals developed by the interrupter 3 over a six second interval, as the interrupter operation is cyclical having, for example, a six second period. The Timing Chart is exemplary of the signal parameters corresponding to the preferred embodiment of the invention disclosed herein; however, the interrupter circuitry may be modified within the teachings of the invention to develop activating output signals having still further signal parameters. For convenience of description each activating output signal provided by the interrupter 3 will be designated by a respective capital letter A through N, the definitions for which are set forth below, and each row in the Timing Chart 20 is designatd by a respective reference numeral 21 through 34. Although specific functions are attributed to each of the signals A through N, such signals may be used to control other functions in the telephone system or in another system in which the device is used.

The first three signals A, B, C represent AC ringing tone signals, which are produced by external equipment at a 20 Hz frequency and are passed by the interrupter 3 such that each signal is on for 2 seconds and off for 4 seconds with each signal being out of phase with the other two as shown by the darkened graph lines in rows 21–23. The priority ringing tone signal D in row 24 is also an AC signal taken from the same 20 Hz signal described above and is passed by the interrupter to an appropriate telephone unit as controlled by the PBX 2 and/or console 4 such that the signal is on for 1 second and off for 2 seconds to effect a ringing of the designated telephone unit at the same rate.

The AC ring back tone signal E in row 25 for indicating in the calling telephone unit that the calling telephone unit is ringing is a combined 440 + 480 Hz signal developed by the external equipment and is passed by the interrupter for a 2 second interval during the 6 second time period, such signal being, for example, in phase with the first ringing tone signal A. The trunk reorder tone signal F in row 26 and busy tone signal G in row 27 are AC signals developed by external equipment, having a 350 + 440 Hz frequency, and the former is passed by the interrupter for one-quarter second intervals during a one-half second period while the latter is passed for one-half second intervals during a one second period. Each of the AC tone signals A through G passed to the telephone system by the AC gating portion 16 in the gating circuit 11 of the interrupter 3.

Each of the DC signals H through M represented in rows 28 through 34 in the Timing Chart 20 is passed by the DC gating portion 17 of the gating circuit 11 for the time intervals and over the time periods shown. Specifically, the message waiting signal H and peg count signal I are provided for one second intervals during three second intervals during three second periods, such signals being out of phase with each other. Each of the fast, slow and wink lamp ground pulses J, K, L provides a grounding circuit to an indicator lamp or to a relay for rapid energization of the same, respectively, for one-quarter second intervals during a one-half second period, one-half second intervals during a one second period, and three-quarters second intervals during a one second period. Also, the PBX sync pulse signal M is produced for one-quarter second at the beginning of each six second time period shown in the Timing Chart and the PBX marker pulse signal N is provided for one-quarter second immediately following the sync pulse, each of the latter two pulses also being, for example, a grounding pulse.

LOGIC CIRCUIT

Turning now specifically to FIG. 4, the logic circuit is shown generally at 10. A regulated power supply 40 is connected between the DC common line 41 and a −50 volt DC line 42. The power supply includes an RC filter network generally indicated at 43 and is coupled across a zener diode 44 that developes, for example, a 10 volt drop thereacross to provide power for the interrupter 3 which is generally shown in FIG. 2. The power supply 40 is preferably designed to handle the range of DC voltages normally used in telephone systems, such as, for example, 44 to 56 volts DC, although the invention is not limited to operation within such voltage range.

The logic circuit 10 includes a plurality of NOR gates and NAND gates, which are conventional devices used in logic circuitry, and for convenience of description below, the two inputs to each gate will be referred to as upper and lower inputs, respectively. Logic 0 and logic 1 signals utilized in the solid state circuitry of the interrupter 3 are represented, respectively, by a −10 volt potential and a ground or common potential, although other voltage levels may be used as should be readily apparent to those skilled in the art.

The clock oscillator 12 may be a conventional 4011 clock oscillator and in the preferred embodiment includes a plurality of NAND gates 45, which are interconnected with a frequency determining RC network 46 as shown in the drawing. Input power to the clock oscillator 12 is received on the line 49 from the regulated power supply 40, and the clock oscillator output is taken on the line 50, such output being, for example, a 120 impulse per minute square wave signal. Also, if desired, a further input 51 may be provided to the clock oscillator 12 to provide synchronization with external equipment. Reverse voltage protection is provided in the logic circuit 10 by diodes 48.

The output from the clock oscillator 12 is connected by the line 50*a* to the input of the modified binary counter 13, which includes JK flip-flops 52 through 55, each of which has its respective J and K inputs connected together. Each JK flip-flop has two states, whereby in the set state the Q output is logic 1 and the $\bar{Q}$ output is logic 0 and in the reset state the Q output is logic 0 and the $\bar{Q}$ output is logic 1. Thus, whenever the J and K inputs to a given flip-flop are at logic 1, that flip-flop will toggle or switch its output state on a logic 0 to logic 1 transition of the clock signal received on the input bus 56 coupled to line 50*a*. The modified binary counter 13 includes additional input lines 57 on which set and reset pulses may be applied to the respective S and R inputs of each of the JK flip-flops 52 through 55 to provide for synchronization with external equipment.

The modified binary counter 13 provides a conventional binary counting function with a modification occurring in the flip-flop 55. The modified binary counter provides twelve separate counts or counting levels depicted in the truth Table 59, illustrated in FIG. 5, respectively in lines 60 through 71. Each Q output of the flip-slops 52 through 55 represents a position 52-Q through 55-Q in a binary number to provide the twelve separate counts starting from the binary number 0000 and completing a cycle with the binary number 0011, which latter number or twelfth count as actually the binary number 1011 having the 1 in the most significant place changes to a 0 by the modified part of the binary counter 13. More specifically and as shown in the Truth Table, the Q output of the flip-flop 55 does not follow normal binary counting sequence at lines 62, 63, 70 and 71. In fact the binary numbers in lines 62, through 71 follow a proper binary counting sequence from the binary number equivalents for zero through eleven with the exception that the digits 2, 3 and 10, 11 have been interchanged, the feedback logic 14 providing for such variation to permit derivation of activating output signals at frequencies that are other than the clock oscillator frequency divided by multiples of two.

The feedback logic 14 in FIG. 4 includes a plurality of NOR gates 72 through 75, NAND gates 76, 77 and inverting high current buffer amplifiers 78, 79 connected as shown in the figure. The modification in counting sequence in the modified binary counter 13 is effected by a connection of the respective J and K inputs of flip-flop 55 to the output line 80 thereof from the feedback network 14. Also, a delay capacitor 81 connected between the parallel coupled J and K inputs of the flip-flop 55 and the negative side of the regulated power supply 40 slows the rise time of the signal applied to such J and K inputs. A similar connection to the J and K inputs of the flip-flop 54 is provided on the line 82 from the output of the NOR gate 74 in the feedback logic 14, and a further delay capacitor 83 having the same function as the capacitor 81 is connected to the latter J and K inputs. Moreover, the J and K inputs to the flip-flop 52 are connected to the clock oscillator output line 49 and such inputs to the flip-flop 53 are connected to the Q output of the flip-flop 52.

The decode output logic 15 is connected to receive input signals from the clock oscillator 12 on the line 50*b* as well as from the Q and $\bar{Q}$ outputs from the JK flip-flops 52 through 55 on the lines 90 through 97. Logic output signals from the logic circuit 10 are provided at the plurality of output terminals 21L through 34L, to control the gating circuit to provide the activating output signals 21 through 34, respectively, depicted in the Timing Chart 20. Each of the output terminals 21L through 34L is connected to the outputs of respective high current inverting buffer amplifiers generally indicated at 99.

A plurality of NOR gates 100 through 107 are connected as shown in FIG. 4 to provide logic output signals at the output terminals 21L through 25L. The output terminal 26L is coupled through a buffer amplifier 99 to the clock oscillator output line 50*b*, and the output terminal 27L is connected through buffer amplifiers 99 and 108 to the output line 91 from the $\bar{Q}$ output of the JK flip-flop 52. Output terminals 21L through 27L are connected to the AC gating portion 16 of the gating circuit 11.

The output terminals 28L through 34L are connected to the DC gating portion 17 of the gating circuit 11. Specifically, the output terminal 28L is connected through the buffer amplifiers 99 and 109 to the output from NOR gate 107, and the output terminal 29L is connected to the line 97 from the $\bar{Q}$ output of the JK flip-flop 55 by way of a buffer amplifier 99. Also, the output terminal 32L is connected to the output from NAND gate 110, and the output terminal 31L is connected to the $\bar{Q}$ output of the JK flip-flop 52, both such connections being through respective buffer amplifiers 99.

Output terminal 30L is connected through a buffer amplifier 99 to an inverting NOR gate 111, and output terminal 33L is connected to a logic gate arrangement including the NOR gates 112, 113, NAND gate 114 and buffer amplifiers 99 and 115. Output terminal 34L is connected through a buffer amplifier 99 to the NOR gate 116, which is coupled to the output from the NAND gate 114 and to the clock oscillator output line 50*b*.

The regulated power supply 40 provides DC power to the logic circuit 10. In the preferred embodiment a common or ground potential is representative of a logic 1 signal level, and a negative 10 volt potential is used to represent a logic 0 level. The clock oscillator 12 produces a periodic square wave output signal that varies between logic 1 and logic 0 levels, such signal being preferably in the form of a square wave having a frequency of 120 impulses per minute in the preferred embodiment, although other frequencies may also be used.

The modified binary counter 13 receives input signals from the clock oscillator output line 50*a* to effect toggling in the several flip-flops 52 through 55 in well known manner each time transition from logic 0 to logic 1 occurs in the clock signal, assuming that proper biasing by a logic 1 signal is also applied to the apropriate J and K inputs to the respective flip-flops. The twelve separate sttes of the modified binary counter 13 are illustrated in the Truth Table under the Outputs portion thereof.

Initially the Q outputs of the flip-flops are at logic 0 and the clock signal is at logic 1. The clock signal then goes to logic 0, but such transition does not effect a change in the modified binary counter 13. During this time interval only the J and K inputs to the flip-flops 52 are at logic 1 level, since the Q output of the latter and the signals on the lines 80 and 82 from the feedback logic 14 are all at logic 0.

When the clock signal goes to logic 1, the flip-flop 52 toggles producing a logic 1 at the Q output as shown in the line 61 of the Truth Table, and providing such signal to the J and K inputs of flip-flop 53 as well as to the second input of the NAND gate 77 in feedback logic 14. The output from such NAND gate then becomes logic 0, which signal is inverted in the buffer amplifier 78 and results in a logic 0 being produced at the output of the NOR gate 75. The latter signal is inverted by the buffer amplifier 79 and applies as a logic 1 to the J and K inputs of the flip-flop 55, thus preparing the latter for toggling upon receipt of the next 0 to 1 transition pulse of the clock signal. When the clock signal goes from the former logic 1 state to a logic 0 state, no change occurs in the modified binary counter 13. However, when the next clock signal transition from logic 0 to logic 1 occurs, the flip-flop 52 goes to its reset condition producing a logic 0 at the Q output thereof, and the flip-flop 53 goes to a set condition producing a logic 1 at the Q output thereof. Also, the flip-flop 55 toggles to produce a logic 1 at the Q output thereof, all being shown in the line 62 of the Truth Table.

At the next logic 0 to logic 1 transition of the clock signal, the flip-flop 52 toggles to the set condition producing a logic 1 at the Q output, but no change occurs in the flip-flops 53 or 55, as shown in line 63 of the Truth Table, since such clock signal transition occurred while the Q output of flip-flop 52 was at logic 0, as were the J and K inputs of the flip-flops 53, 54 and 55. The first and second inputs to the NOR gate 73 are now, respectively, at logic 1 and logic 0, and both inputs to the NAND gate 76 are at logic 1. Thus, the output from NOR gate 74 is a logic 1 signal, which is applied to the J and K inputs of the flip-flop 54.

When the next clock signal transition from logic 0 to logic 1 occurs, all of the flip-flops 52 through 55 will toggle such that the Q outputs of flip-flops 52, 53 and 55 will be logic 0 and the Q output of flip-flop 54 will be logic 1, as is shown at line 64 of the Truth Table. Moreover, the binary counter continues in operation as described above to achieve the various additional counting states illustrated in the subsequent lines of the Truth Table and repeating itself cyclically over 6 second periods.

The logic output signals produced at the output terminals 21L through 34L of the decode output logic 15 are utilized in the gating circuit 11 to effect passage of corresponding activating output signals A through N from the interrupter as indicated in the Truth Table of FIG. 5. Specifically, the Outputs portion of the Truth Table shown at 59 indicates in the columns A through N the counting interval during which the respective activating output signals are passed by the interrupter relative to the Q outputs of the modified binary counter 13 such passage being represented by the numeral 1, and the intervals during which such signals are not passed are indicated by the numeral 0. Moreover, a logic 0 produced at any one of the output terminals 21L through 27L and 30L through 34L will effect passage of a corresponding activating output signal by the gating circuit of the interrupter, and a logic 1 logic output signal at the output terminals 28L and 29L also effect passage of appropriate activating signals; similarly, the opposite logic level at the respective output terminals 21L through 34L will prohibit the gating circuit from passing corresponding activating output signals from the interrupter.

The output terminals 21L, 25L andd 23L are responsive to the NOR gates 100 through 104. Thus, during the first counting state of the modified binary counter 13 as represented on the first line of the Truth Table, the output from NOR gate 100 is logic 1, since the inputs thereto are logic 0, and the output from NOR gate 101 is logic 0, since the inputs thereto are logic 1. Thus, the output from NOR gate 102 is logic 0, such signal being coupled to the second input of the NOR gate 103. Since the first input to the NOR gate 103 is at logic 0, the output therefrom is a logic 1, which is inverted by the buffer amplifier 99 and provided to the gating circuit 11 to effect passage to the first ringing tone and ring back tone activating output signals A and E from the interrupter, as represented by the numeral 1 in the box at the intersection of line 60 and column A/E of the Truth Table. Moreover, the logic 1 provided by the NOR gate 103 output is coupled to the first input of the NOR gate 104, which receives a logic 0 at its second input; and, therefore, the output therefrom is a logic 0, which is inverted by the buffer amplifier 99 becoming a logic 1 and preventing passage of the third ringing tone activating output signal C from the interrupter until the modified binary counter 13 reaches the counting states illustrated in lines 68 through 71 of the Truth Table.

The output terminal 22L is directly responsive to the Q output of the flip-flop 54, as inverted by the buffer amplifier 99, and the output terminal 24L is controlled by the NOR gates 105, 106, 107, which are coupled to the modified binary counter 13, in a manner similar to that described above with reference to the output terminals 21L, 25L. The output terminals 27L through 29L, 31L and 32L are similarly controlled either directly or indirectly by the respective outputs from the flip-flops 52 through 55, and the output terminal 26L is provided by the buffer amplifier 99 with a logic signal having the same frequency but opposite phase of the clock signal.

NAND gate 110, which is coupled directly to the clock oscillator output line **50*b* and to the Q output of the flip-flop 52 provides a logic 1 output when at least one of such inputs is at logic 0 and produces a logic 0 output when both of said inputs are at logic 1. Since the flip-flop 52 toggles only on the 0 to 1 transition of the clock signal and since the clock signal is logic 0 during half the interval that the Q output from the flip-flop 52 is at logic 1, the output from NAND gate 110 will be at logic 1 for a duration equal to the time between four clock signal transitions and will then go to logic 0 for a duration equal to the time between two such transitions. Thus, the logic output signal at the output terminal 32L is logic 0 whenever a numeral 1 appears in the Truth Table at column L and a logic 1 whenever a numeral 0** appears.

The logic output signal at the output terminal 30L is directly responsive to the clock signal, which is applied as both inputs to the NOR gate 111. Thus, the frequency of the logic output signal appearing at the output terminal 30L will be identical to that of the clock signal. Moreover, the logic circuitry including the gates 112 through 114 and 116 and the buffer amplifier 115 respond to the clock signal at the NOR gates 113 and 116 as well as to the various outputs of the modified binary counter 13 to result in logic output signals at output terminals 33L, 34L as indicated in columns M and N of the Truth Table.

GATING CIRCUIT

Figure 6:
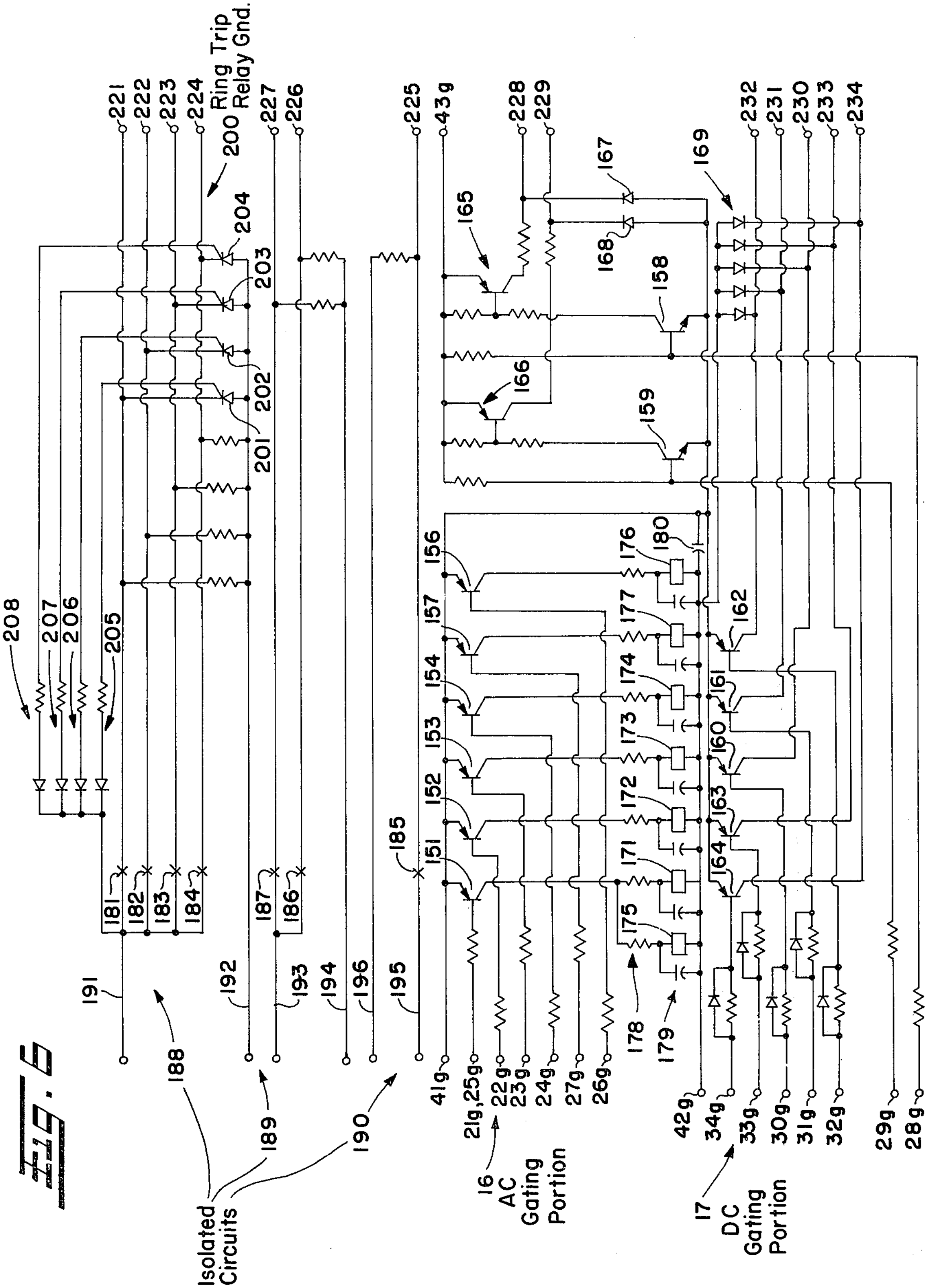

Referring now to FIG. 6, the gating circuit is indicated generally at 11. The gating circuit includes the AC gating portion 16 and the DC gating portion 17, each having respective input terminals **21*g*through 34*g*, which correspond to the respective output terminals of the decode output logic 15 in the logic circuit 10. Additionally, the input terminals 41*g* and 42*g* are connected, respectively to the input terminals 41, 42 of the regulated power supply 40; and another DC input from, for example, the positive side of a booster battery, is provided to the input terminal 43*g* of the gating circuit 11.**

The gating circuit input terminals **21*g* through 27*g* are connected through respective input resistors to the bases of respective transistors 151 through 154, 156 and 157, and the input terminals 28*g* through 34*g* in the DC gating portion 17 are connected through respective input resistors to the bases of respective transistors 158 through 164. Each of the input resistors to the transistors 160 through 164** is shunted by a respective diode to assure cut-off of respective transistors when the logic signals to the bases thereof go from logic 0 to logic 1, and such transistors are preferably respective darlington pair transistors, which are selected for their high current gain and power dissipation properties.

The resistor and transistor circuits 165, 166, which are connected, respectively, to the collectors of the transistors 158, 159 provide for a signal inversion of the collector output of the transistors 158, 159 and a level shift thereof, whereby the activating output signals provided at the output channels 228, 229, which correspond to the signals H and I shown in lines 28 and 29 of the Timing Chart 20 of FIG. 3, are at the level of the booster battery input at the terminal **43*g*. Diodes 167, 168 connected to the output channels 228, 229, respectively, and the plurality of diodes generally indicated at 169 connected respectively to the output channels 230 through 234** provide for diode suppression to prevent damage to the respective transistors in the event of the occurrence of a voltage spike if the activating output signals from such output channels are coupled to operate relays or other inductive devices.

Each of the transistors 151 through 154, 156 and 157 is coupled in series with respective solid state relay devices 171 through 174, 176 and 177, and a further solid state relay 175 is also connected to the collector output of the transistor 151. Each of the solid state relays 171 through 177 is connected in series with a respective one of the plurality of resistors generally indicated at 178 and is coupled in parallel with a respective one of a plurality of filter capacitors generally indicated at 179, and a further filter capacitor 180 is connected between the input terminals 41*g*, 42*g*. The solid state relays are commercially available devices, such as, for example, the model 640-1 transistor type solid state relay or the model 641-1 triac type solid state relay manufactured by Teledyne, Hawthorne, Calif., the former having effectively zero offset voltage and very low on contact resistance and being capable of switching low level AC signals from about 0.25 volts to about 12 volts over a frequency range of about 300 Hz to about 1KHz, and the latter being capable of switching the 110 volt AC 20 Hz ring signals. Thus, solid state relays 175, 176, and 177 are preferably the 640-1 type and the solid state relays 171 through 174 are preferably the 641-1 type, although other similar devices may be substituted for the specific solid state relays, provided that they present similar operating characteristics especially with regard to the low voltage, high frequency signals controlled by relays 175–177, which signals cannot afford high degrees of distortion.

A plurality of normally open contacts 181 through 187, which are illustrated as mechanical contacts for convenience, are respectively operated to "closure" by the respective solid state relays 171 through 177, such contacts being located in respective isolated circuits 188, 189, 190, which are coupled for receipt of AC tone signals from external equipment. For example, a 110 volt 20 Hz ringing tone signal may be applied between the line 191 and the common line 192, a 350 + 440 Hz busy tone and reorder tone signals may be applied between the line 193 and the common line 194, and a 440 + 480 Hz ring back tone signal may be applied between the line 195 and the common line 196. Each of the contacts 181 through 187 controls the passage of the AC tone signals received on the respective lines 191, 193 and 195 to the respective interrupter output channels 221 through 227 for coupling in the telephone system to effect the signalling functions described above.

A ring trip relay grounding circuit 200 is provided for each of the output channels 221 through 224 to provide a ground for the latter and the ring trip relay located in the telephone units during the "silent period" when the respective contacts 181 through 184 are open. The ring trip relay immediately cuts-off any ringing tone signals applied to the telephone unit when the latter goes off hook. The ring trip relay grounding circuit 200 includes a plurality of SCR's 201 through 204, which have their cathodes connectd to the respective output channels 221 through 224 and their gating circuits connected through respective resistors and diode circuits 205 through 208 to the line 191 on which the ringing tone signal is received. The anodes of the SCR's 201 through 204 are coupled to the ring common line 192. If desired, triacs or similar devices may be substituted for the SCR's 201 through 204.

The gating circuit 11 receives input logic signals from the logic circuit 10 and provides activating output signals at the output channels 221 through 234 in response thereto. For example, when a logic 0 signal is received at the input terminals 21*g*, 25*g* of the gating circuit 11, such signal in fact being a −10 volt level, the transistor 151 closes a circuit to effect energization of the solid state relays 171, 175, which close the isolated circuits 188, 190. Thus, for the duration that the logic 0 signal is applied to the input terminals 21*g*, 25*g*, a 20 Hz rining tone activating output signal will be provided at the output channel 221 for effecting a ringing signal at the appropriate telephone unit as determined by the PBX, and a 440 + 480 Hz tone signal will be provided at the interrupter output channel 225 for providing a ringing sound in the calling telephone unit. Similar operation of the gating circuit occurs for the other input terminals 22*g*, 23*g*, 24*g*, 26*g*, and 27*g* in the AC gating portion 16 upon receipt of logic 0 signals thereat.

If the called telephone unit is answered during occurrence of a ringing tone signal provided at one of the channels 221 through 224, the ring trip relay is energized therein to cut-off such signal; and if the called unit is answered during the silent period, then the gating circuit provided by the appropriate resistor and diode circuit 205 through 208 to the line 191 permits the corresponding SCR to conduct providing a ground to line 192 for the ring trip relay to energize the same. An advantage to the ring trip grounding circuit 200 as connected is that the SCR's can only be gated to conduction during the positive half cycle of the ringing tone signal, but cannot conduct such signal at that time due to the reverse polarity connection of the SCR; and, therefore, the SCR's will not short circuit the ringing tone signal.

Whenever a logic 0 signal is received at one of the input terminals 30*g* through 34*g* of the DC gating portion 17, the corresponding transistor 160 through 174 becomes conductive to provide a grounding pulse by way of a connection to the DC common line input terminal 41*g* at the respective output channels 230 through 234. When a logic 0 is applied to the input terminal 34*g*, the transistor 164 becomes conductive, and a grounding pulse is applied to the output channel 234, for example, to complete a circuit to a device in the telephone system or to short circuit a signal occurring therein. When the logic signal goes to logic 1, the transistor 164 is cutoff, and the grounding signal is removed from the output channel 234, while the appropriate diode 169 provides a grounding path for any negative voltage spike appearing at the output channel.

The input terminals 28*g*, 29*g* to the gating circuit 11 are different from the input terminals 22*g* through 27*g* and 30*g* through 34*g* in that the transistors 158, 159 coupled thereto become conductive when a logic 1 signal is received at the appropriate input terminal. Thus, when a logic 1 signal is applied to the input terminal 28*g* the transistor 158 becomes conductive to effect conduction in the transistor 165, the latter closing a circuit between the booster battery input terminal 43*g* and the interrupter output channel 228. Similar operation occurs for the transistorized circuit coupled to the input terminal 29*g*, and the respective diodes 167, 168 provide for voltage spike suppression in a manner similar to the diodes 169 discussed above.

The interrupter 3 is free-running and provides at the output channels 221 through 234 the multiple activating output signals A through N in the time frame depicted, for example, in the Timing Chart 20, which signals may be used for a variety of signalling functions in a telephone system. While the interrupter 3 is described above with reference to employment in a telephone system, such apparatus may be, of course, utilized in other systems which require the generation of plural time related signals therein. Moreover, the logic and gating circuits may be extended or reduced to provide an interrupter capable of providing more or fewer signalling functions than the preferred embodiment described.

The embodiments of the invention in which an exclusive property or privilege is claimed are defined as follows:

1. A solid state circuit for cyclically interrupting a plurality of input signals and providing the same as a plurality of interrupted activating output signals, the latter signals being provided at respective output channels, comprising means for receiving such plurality of input signals; a plurality of output channels on which such plurality of interrupted activating output signals are provided; clock means for providing a cyclical clock signal; counting means coupled to said clock means for cyclically counting sequentially to a plurality of discrete counting levels, said counting means generating counting signals indictive of the discrete counting levels; generating means for generating a plurality of logic signals in response to such cyclical clock signal and such counting signals; and gating means coupled to said generating means for selectively gating such plurality of input signals to pass the same to such respective output channels in response to receipt of respective logic signals, said gating means passing to respective output channels each of such interrupted activating output signals and each such interrupted activating output signal being passed at a respective frequency and for a respective duty cycle.

2. A solid state circuit for cyclically interrupting a plurality of input signals and providing the same as a plurality of interrupted activating signals as set forth in claim 1, further comprising means for supplying regulated input electric power to said solid state circuit, whereby the latter is free running.

3. A solid state circuit for cyclically interrupting a plurality of input signals and providing the same, as a plurality of interrupted activating signals as set forth in claim 1, wherein said clock means comprises oscillator means for generating such cyclical clock signal at a first frequency.

4. A solid state circuit for cyclically interrupting a plurality of input signals and providing the same as a plurality of interrupted activating signals as set forth in Claim 3, wherein said counting means comprises a binary counter.

5. A solid state circuit for cyclically interrupting a plurality of interrupted activating output signals as set forth in claim 4, wherein said binary counter comprises a plurality of JK flip-flop means for generating such counting signals indicative of respective discrete counting levels, and further comprising feedback logic circuit means for modifying the normal counting sequence of binary counter.

6. A solid state circuit for cyclically interrupting a plurality of input signals and providing the same as a plurality of interrupted activating output signals as set forth in claim 5, wherein each respective JK flip-flop means comprises a pair of parallel connected J and K input circuits, and further comprising a capacitor connected to at least one of said pairs of J and K input circuits for delaying toggling of the respective JK flip-flop.

7. A solid state circuit for cyclically interrupting a plurality if input signals and providing the same as a plurality of interrupted activating output signals as set forth in claim 1, wherein said counting means comprises a binary counter including a plurality of JK flip-flop means for generating such counting signals indicative of the discrete counting levels, and feedback circuit means for modifying the normal counting sequence of said binary counter.

8. A solid state circuit for cyclically interrupting a plurality of innput signals and providing the same as a plurality of interrupted activating output signals as set forth in claim 1, where in said generating means comprises a plurality of logic circuits.

9. A solid state circuit for cyclically interrupting a plurality of input signals and providing the same as a plurality of interrupted activating output signals as set forth in claim 8, wherein said generating means further comprises a plurality of high current inverting buffer amplifiers, each respective amplifier being connected as a respective output for said generating means.

10. A solid state circuit for cyclically interrupting a plurality of input signals and providing the same as a plurality of interrupted activating output signals as set forth in claim 9, wherein said gating means comprises a plurality of transistor circuits coupled to receive input signals from respective amplifiers.

11. A solid state circuit for cyclically interrupting a plurality of input signals and providing the same as a plurality of interrupted activating output signals as set forth in claim 1, wherein said gating means comprises a plurality of transistor circuits.

12. A solid state circuit for cyclically interrupting a plurality of input signals and providing the same as a plurality of interrupted activating output signals as set forth in claim 1, wherein said plurality of input signals include a plurality of AC signals and a plurality of DC signals, and said gating means comprises a first plurality of transistor circuits for controlling passage of AC activating output signals at respective ones of said output channels and a second plurality of transistor circuits for controlling passage of DC activating output signals at the other respective ones of said output channels.

13. A solid state circuit for cyclically interrupting a plurality of input signals and providing the same as a plurality of interrupted activating output signals as set forth in claim 12, further comprising a plurality of solid state relay means coupled respectively to transistor circuits in said first plurality of transistor circuits for passing such AC activating output signals to respective output channels.

14. A solid state circuit for cyclically interrupting a plurality of input signals and providing the same as a plurality of interrupted activating output signals as set forth in claim 13, wherein said means for receiving comprises a plurality of isolated circuits for receiving respective input AC signals, said solid state relay means being connected in respective ones of said isolated circuits for passing such input AC signals as AC activating output signals to respective output channels.

15. A solid state interrupter for interrupting AC and DC input signals and providing the same as interrupted activating output signals for controlling signalling functions in a telephone system or the like, comprising a plurality of output channels on which such interrupted activating output signals are provided; clock means for providing a cyclical clock signal; counting means coupled to said clock means for cyclically counting sequentially to a plurality of discrete counting levels, said counting means generating counting signals indicative of the discrete counting levels; means for developing a plurality of logic signals in response to such cyclical clock signal and such counting signals; a plurality of isolated circuit means for receiving such AC input signals; means for receiving said DC input signals; gating means coupled to said means for developing for selectively gating said plurality of input signals to pass the same at respective output channels as activating output signals in response to receipt of respective logic signals, said gating means comprising first and second portions, said first portion including a plurality of transistor gating circuits and a plurality of solid state relay means coupled to respective transistor circuits for controlling passage of such respective AC input signals in said isolated circuits, and said second portion including a plurality of respective transistor circuits for selectively passing such respective DC input signals.

16. A solid state interrupter for interrupting AC and DC input signals and providing the same as interrupted activating output signals for controlling signalling functions in a telephone system of the like as set forth in claim 15, further comprising a ring trip relay grounding circuit coupled at least one of said isolated circuit means, said ring trip relay grounding circuit comprising means for providing a grounding circuit to a ring trip relay in a telephone unit.

17. A solid state interrupter for interrupting AC and DC input signals and providing the same as interrupted activated output signals for controlling signalling functions in a telephone system or the like as set forth in claim 16, wherein said ring trip relay grounding circuit comprises an SCR having the anode connected to a ground line of said at least one of said isolated circuit means, the cathode connected to a respective output channel and the gate connected through a resistor and reverse poled diode to an input line for said at least one isolated circuit means, whereby when the respective solid state relay is open, a gating circuit is provided to said SCR from the ring trip relay at the telephone unit through the cathode and gate of the SCR, the resistor and the reverse poled diode, the input line of said at least one isolated circuit, AC input signal bypassing the open solid state relay to effect gating of the SCR which causes the latter to conduct closing a ground circuit to the ring trip relay.

18. A solid state interrupter for interrupting AC and DC input signals and providing the same as interrupted activating output signals for controlling signalling functions in a telephone system or the like as set forth in claim 17, wherein said gating means passes to respective output channels each of said plurality of interrupted activating output signals and each such interrupted activating output signal being passed at a respective frequency and for a respective duty cycle.

* * * * *